United States Patent
Andreeva et al.

(10) Patent No.: US 9,871,813 B2
(45) Date of Patent: Jan. 16, 2018

(54) METHOD OF AND SYSTEM FOR PROCESSING AN UNAUTHORIZED USER ACCESS TO A RESOURCE

(71) Applicant: YANDEX EUROPE AG, Lucerne (CH)

(72) Inventors: Ekaterina Aleksandrovna Andreeva, Saint-Petersburg (RU); Yury Alekseyevich Leonychev, Moscow (RU); Egor Vladimirovich Ganin, Moscow Region (RU); Sergey Aleksandrovich Lavrinenko, Rostov-on-don (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/511,084

(22) PCT Filed: Feb. 24, 2015

(86) PCT No.: PCT/IB2015/051382
§ 371 (c)(1),
(2) Date: Mar. 14, 2017

(87) PCT Pub. No.: WO2016/067118
PCT Pub. Date: May 6, 2016

(65) Prior Publication Data
US 2017/0251008 A1 Aug. 31, 2017

(30) Foreign Application Priority Data
Oct. 31, 2014 (RU) .................. 2014144087

(51) Int. Cl.
*H04L 29/06* (2006.01)
*G06F 21/31* (2013.01)
*H04L 29/08* (2006.01)

(52) U.S. Cl.
CPC ........ *H04L 63/1425* (2013.01); *G06F 21/316* (2013.01); *H04L 63/102* (2013.01);
(Continued)

(58) Field of Classification Search
CPC . H04L 63/1425; H04L 63/102; H04L 67/146; H04L 67/22; H04L 67/306; G06F 21/316
See application file for complete search history.

(56) References Cited

U.S. PATENT DOCUMENTS 5,765,149 A   6/1998 Burrows
5,983,216 A   11/1999 Kirsch et al.
(Continued)

FOREIGN PATENT DOCUMENTS

AU   2008254644 A1   11/2008
CN   103064956 A   4/2013
(Continued)

OTHER PUBLICATIONS

International Search Report for PCT/IB2015/051027, Blaine R. Copenheaver, dated Jun. 24, 2015.
(Continued)

*Primary Examiner* — Brandon Hoffman
*Assistant Examiner* — Nega Woldemariam
(74) *Attorney, Agent, or Firm* — BCF LLP

(57) ABSTRACT

There is provided a method of processing a potentially unauthorized user access request. The method is executable on a server. The method comprises: receiving a first session identifier associated with a first communication session associated with a user account; receiving a second session identifier associated with a second communication session associated with the user account; based on user behavior within the first communication session, generating a first user behavior model associated with the first communication session; based on user behavior within the second commu- (Continued)

nication session, generating a second user behavior model associated with the second communication session; responsive to one of the first user behavior model and the second user behavior model being different from a stored authorized user behavior model associated with the user account, restricting user activity within the respective one of the first communication session and the second communication session.

20 Claims, 5 Drawing Sheets

(52) U.S. Cl.
CPC ............ *H04L 67/146* (2013.01); *H04L 67/22* (2013.01); *H04L 67/306* (2013.01)

(56) References Cited

U.S. PATENT DOCUMENTS

| | | |
|---|---|---|
| 6,529,903 B2 | 3/2003 | Smith et al. |
| 6,721,728 B2 | 4/2004 | McGreevy |
| 6,772,150 B1 | 8/2004 | Whitman et al. |
| 6,865,575 B1 | 3/2005 | Smith |
| 7,136,854 B2 | 11/2006 | Smith |
| 7,346,839 B2 | 3/2008 | Acharya et al. |
| 7,424,486 B2 | 9/2008 | Whitman et al. |
| 7,426,507 B1 | 9/2008 | Patterson |
| 7,536,408 B2 | 5/2009 | Patterson |
| 7,577,643 B2 | 8/2009 | Dominowska et al. |
| 7,599,914 B2 | 10/2009 | Patterson |
| 7,644,075 B2 | 1/2010 | Zeng et al. |
| 7,725,424 B1 | 5/2010 | Ponte |
| 7,774,348 B2 | 8/2010 | Delli et al. |
| 7,788,252 B2 | 8/2010 | Delli et al. |
| 7,805,450 B2 | 9/2010 | Santi et al. |
| 7,877,404 B2 | 1/2011 | Achan et al. |
| 7,925,498 B1 | 4/2011 | Baker et al. |
| 8,099,412 B2 | 1/2012 | Yan et al. |
| 8,117,223 B2 | 2/2012 | Patterson |
| 8,126,874 B2 | 2/2012 | Sercinoglu et al. |
| 8,145,645 B2 | 3/2012 | Delli et al. |
| 8,166,021 B1 | 4/2012 | Cao et al. |
| 8,166,045 B1 | 4/2012 | Mazumdar et al. |
| 8,244,752 B2 | 8/2012 | Buehrer et al. |
| 8,352,452 B2 | 1/2013 | Dean et al. |
| 8,359,326 B1 | 1/2013 | Garg et al. |
| 8,402,033 B1 | 3/2013 | Mazumdar et al. |
| 8,448,247 B2 | 5/2013 | Stute |
| 8,463,774 B1 | 6/2013 | Buron et al. |
| 8,478,704 B2 | 7/2013 | Risvik et al. |
| 8,489,628 B2 | 7/2013 | Patterson |
| 8,521,516 B2 | 8/2013 | Och et al. |
| 8,600,975 B1 | 12/2013 | Cao et al. |
| 2002/0123988 A1 | 9/2002 | Dean et al. |
| 2003/0207685 A1 | 11/2003 | Rankin |
| 2004/0024653 A1 | 2/2004 | Edgardo et al. |
| 2004/0254920 A1 | 12/2004 | Brill et al. |
| 2004/0261021 A1 | 12/2004 | Mittal et al. |
| 2005/0198068 A1 | 9/2005 | Mukherjee et al. |
| 2005/0228770 A1 | 10/2005 | Willamson et al. |
| 2006/0282660 A1* | 12/2006 | Varghese ............ G06Q 20/341 713/155 |
| 2007/0022101 A1 | 1/2007 | Smith et al. |
| 2007/0143278 A1 | 6/2007 | Srivastava et al. |
| 2007/0239473 A1 | 10/2007 | Picolli |
| 2008/0148376 A1 | 6/2008 | Onozawa et al. |
| 2008/0243783 A1 | 10/2008 | Santi et al. |
| 2008/0301117 A1 | 12/2008 | Zeng et al. |
| 2009/0006856 A1 | 1/2009 | Abraham et al. |
| 2009/0007227 A1 | 1/2009 | Burgess et al. |
| 2009/0172772 A1 | 7/2009 | Souille |
| 2009/0292743 A1 | 11/2009 | Bigus et al. |
| 2009/0327162 A1 | 12/2009 | Dangaltchev et al. |
| 2010/0050253 A1 | 2/2010 | Baughman et al. |
| 2010/0281011 A1 | 11/2010 | Santi et al. |
| 2011/0040733 A1 | 2/2011 | Sercinoglu et al. |
| 2011/0179023 A1 | 7/2011 | Dean et al. |
| 2011/0314045 A1 | 12/2011 | Koenig et al. |
| 2012/0221548 A1 | 8/2012 | Delli et al. |
| 2012/0278350 A1 | 11/2012 | Bhatia et al. |
| 2012/0317196 A1 | 12/2012 | Schigel et al. |
| 2013/0173610 A1 | 7/2013 | Hu et al. |
| 2013/0181972 A1 | 7/2013 | Fowler et al. |
| 2013/0239191 A1 | 9/2013 | Bostick |
| 2013/0346311 A1 | 12/2013 | Boding et al. |
| 2014/0189525 A1 | 7/2014 | Trevisiol et al. |
| 2014/0201120 A1 | 7/2014 | Lydon et al. |
| 2014/0201841 A1 | 7/2014 | Deshpande et al. |

FOREIGN PATENT DOCUMENTS

| | | |
|---|---|---|
| CN | 101796515 B | 9/2013 |
| CN | 103646197 A | 3/2014 |
| EP | 2171621 A1 | 4/2010 |
| ES | 2428546 T3 | 11/2013 |
| JP | 5255055 B2 | 8/2013 |
| RU | 105042 U1 | 5/2011 |
| RU | 2506644 C2 | 3/2012 |
| WO | 2005091825 A2 | 10/2005 |
| WO | 2008144732 A1 | 11/2008 |
| WO | 2009065056 A2 | 5/2009 |
| WO | 2013101489 A1 | 7/2013 |
| WO | 2013181972 A1 | 12/2013 |

OTHER PUBLICATIONS

International Preliminary Report on Patentability for PCT/IB2015/051027, Krisna Lim, dated Feb. 5, 2016.
English abstract for CN 103646197 retrieved from Espacenet on Mar. 2, 2016.
English abstract for CN 101796515 retrieved from Espacenet on Mar. 14, 2017.
English abstract for CN 103064956 retrieved from Espacenet on Mar. 14, 2017.
English abstract for JP 5255055 retrieved from Espacenet on Mar. 14, 2017.
English abstract for ES 2428546 retrieved from Espacenet on Mar. 14, 2017.
English abstract for RU 2506644 retrieved from Espacenet on Mar. 14, 2017.
Rocha et al., "A2BeST: An Adaptive Authentication Service Based on Mobile User's Behavior and Spatio-Temporal Context", Federal Universtiy of Santa Catarina (UFSC), IEEE, 2011, pp. 771-774.
English abstract for RU 105042 retrieved from Espacenet on Mar. 14, 2017.
International Search Report from PCT/IB2015/051382 dated Jul. 13, 2015, Thomas, Shane.
International Preliminary Report on Patentability from PCT/IB2015/051382 dated Jan. 19, 2016.
U.S. Appl. No. 15511082, filed Mar. 14, 2017.

* cited by examiner

METHOD OF AND SYSTEM FOR PROCESSING AN UNAUTHORIZED USER ACCESS TO A RESOURCE

CROSS-REFERENCE

The present application claims priority to Russian Patent Application No. 2014144087, filed Oct. 31, 2014, entitled "METHOD OF AND SYSTEM FOR PROCESSING AN UNAUTHORIZED USER ACCESS TO A RESOURCE" the entirety of which is incorporated herein.

FIELD

The present technology relates to methods of and systems for processing an unauthorized user access to a resource.

BACKGROUND

These days, a typical user of an electronic device has access to a plurality of applications, each of the plurality of applications is geared towards helping the user to solve a particular user-problem. For example, an e-mail application is geared towards enabling user to send and receive electronic messages, be it for work or pleasure purposes. A web browser allows the user to browse the Internet for resources that may be responsive to user queries, again, both for work-related and personal-related matters.

A typical service provider provides a number of user-services, such as an e-mail service, a cloud storage service, a scheduling service, a movie download service and the like.

The user has access to a number of electronic devices (be it a desktop computer, a laptop computer, a wireless communication device, a smart TV or the like). Most of these electronic devices are connected to the Internet to help the user to solve one or more of user-problems by accessing the Internet and findings resources that are geared to helping the user to solve her user-problem. Unfortunately, some malicious individuals have taken advantage of such wide-spread proliferation of electronic devices coupled to the Internet I the pursuit of their malicious intents.

For example, some such malicious individuals and organizations have 'hacked into" various user accounts and used them as a platform to send out unwanted e-mails (also known as SPAM for short).

SUMMARY

It is an object of the present technology to ameliorate at least some of the inconveniences present in the prior art.

According to a first broad aspect of the present technology, there is provided a method of processing a potentially unauthorized user access request. The method can be executed on a server. The method comprises: receiving a first session identifier associated with a first communication session associated with a user account; receiving a second session identifier associated with a second communication session associated with the user account; based on user behaviour within the first communication session, generating a first user behaviour model associated with the first communication session; based on user behaviour within the second communication session, generating a second user behaviour model associated with the second communication session; responsive to one of the first user behaviour model and the second user behaviour model being different from a stored authorized user behaviour model associated with the user account, restricting user activity within the respective one of the first communication session and the second communication session.

In some implementations of the method, the method further comprises allowing unrestricted user activity within the other one of the first communication session and the second communication session.

In some implementations of the method, the first session identifier comprises a session cookie.

In some implementations of the method, the second session identifier comprises a session cookie.

In some implementations of the method, the first communication session is executed on a first electronic device and the second communication session is executed on a second electronic device.

In some implementations of the method, the first communication session and the second communication session are executed on the same electronic device.

In some implementations of the method, the step of generating the first user behaviour model comprises analyzing at least one of: device-specific parameter and user-device interaction parameter.

In some implementations of the method, the user-device interaction parameter comprises at least one of: user-associated click pattern; user-associated mouse movement pattern; user-associated typing pattern; user-specific function execution pattern; a user time patterns when the user typically establishes user sessions.

In some implementations of the method, the device specific parameter comprises at least one of: a network address associated with a user electronic device typically used for establishing user sessions; a version of a browsing application used by the user for establishing user sessions.

In some implementations of the method, the user-device interaction parameter comprises at least one of: a short term user-device interaction parameter and a long term user-device interaction parameter.

In some implementations of the method, the method further comprises at a time prior to the receiving, generating the stored authorized user behaviour model associated with the user account.

In some implementations of the method, the step of generating the stores authorised user behaviour model comprises analyzing at least one of: device-specific factors and user-device interaction factors.

In some implementations of the method, the step of restricting comprises blocking access to the user account.

In some implementations of the method, the step of restricting comprises allowing limited functionality with the user account.

In some implementations of the method, prior to the step of restricting, the method further comprises executing a verification routine within the respective one of the first communication session and the second communication session to confirm if the user access is unauthorized.

In some implementations of the method, the restricting comprises associating a cookie that is in turn associated with the respective one of the first communication session and the second communication session with a flag indicative of a security-violation parameter.

In some implementations of the method, the method further comprises determining a security-violation parameter indicative of a degree of trust that the respective one of the first communication session and the second communication session is associated with an authorized user.

In some implementations of the method, the security-violation parameter is embodied in a cookie stored in association with the respective one of the first communication session and the second communication session.

In another broad aspect of the present technology, there is provided a server. The server comprises a communication interface for communication with an electronic device via a communication network, a processor operationally connected with the communication interface, the processor configured to process a potentially unauthorized user access request, the processor being further configured to: receive a first session identifier associated with a first communication session associated with a user account; receive a second session identifier associated with a second communication session associated with the user account; based on user behaviour within the first communication session, generate a first user behaviour model associated with the first communication session; based on user behaviour within the second communication session, generate a second user behaviour model associated with the second communication session; responsive to one of the first user behaviour model and the second user behaviour model being different from a stored authorized user behaviour model associated with the user account, restrict user activity within the respective one of the first communication session and the second communication session.

In some implementations of the server, the processor is further configured to allow unrestricted user activity within the other one of the first communication session and the second communication session.

In some implementations of the server, the first session identifier comprises a session cookie.

In some implementations of the server, the second session identifier comprises a session cookie.

In some implementations of the server, the first communication session is executed on a first electronic device and the second communication session is executed on a second electronic device.

In some implementations of the server, the first communication session and the second communication session are executed on the same electronic device.

In some implementations of the server, to generate the first user behaviour model, the processor is configured to analyze at least one of: device-specific parameter and user-device interaction parameter.

In some implementations of the server, the user-device interaction parameter comprises at least one of: user-associated click pattern; user-associated mouse movement pattern; user-associated typing pattern; user-specific function execution pattern; a user time patterns when the user typically establishes user sessions.

In some implementations of the server, the device specific parameter comprises at least one of: a network address associated with a user electronic device typically used for establishing user sessions; a version of a browsing application used by the user for establishing user sessions.

In some implementations of the server, the user-device interaction parameter comprises at least one of: a short term user-device interaction parameter and a long term user-device interaction parameter.

In some implementations of the server, the processor is further operable, at a time prior to executing receiving, to generate the stored authorized user behaviour model associated with the user account.

In some implementations of the server, to generate the stored authorised user behaviour model, the processor is configured to analyze at least one of: device-specific factors and user-device interaction factors.

In some implementations of the server, to restrict, the processor is configured to block access to the user account.

In some implementations of the server, to restrict, the processor is configured to allow limited functionality with the user account.

In some implementations of the server, prior to executing restricting, the processor is configured to execute a verification routine within the respective one of the first communication session and the second communication session to confirm if the user access is unauthorized.

In some implementations of the server, to restrict, the processor is configured to associate a cookie that is in turn associated with the respective one of the first communication session and the second communication session with a flag indicative of a security-violation parameter.

In some implementations of the server, the processor being further configured to determine a security-violation parameter indicative of a degree of trust that the respective one of the first communication session and the second communication session is associated with an authorized user.

In some implementations of the server, the security-violation parameter is embodied in a cookie stored in association with the respective one of the first communication session and the second communication session.

According to another broad aspect of the present technology, there is provided a method of authenticating a user in a network. The method is executed on a server. The method comprises: acquiring a non-authorized user-behavior model associated with a non-authorized access to a network resource by an unauthorized entity, the non-authorized user-behavior model having been generated during blocking the non-authorized access to the network resource by the unauthorized entity; retrieving from a log stored on the network server, an indication of a plurality of users, each respective user associated with a respective user-behavior model; responsive to one of the respective user-behavior model matching the non-authorized user-behavior model, associating a user account associated with the respective user associated with the one of the respective user-behavior model with a security-violation parameter; responsive to the security-violation parameter, restricting user activity within the user account.

In some implementations of the method, the method further comprises, prior to the restricting, executing a verification routine within the respective user account to confirm if the user access is unauthorized.

In some implementations of the method, the step of executing the verification routine comprises presenting a user associated with the user account a challenge question.

In some implementations of the method, the security-violation parameter comprises a cookie associated with the user account augmented with a flag indicative of the security-violation parameter.

In some implementations of the method, the security-violation parameter is indicative of a degree of trust that the user associated with the user account is an un-authorized user.

In some implementations of the method, the step of restricting comprises blocking access to the user account.

In some implementations of the method, the step of restricting comprises allowing limited functionality with the user account.

In some implementations of the method, the non-authorized user-behavior model has been generated by analyzing at least one of: device-specific parameter and user-device interaction parameter.

In some implementations of the method, the user-device interaction parameter comprises at least one of: user-associated click pattern; user-associated mouse movement pattern; user-associated typing pattern; user-specific function execution pattern; a user time patterns when the user typically establishes user sessions.

In some implementations of the method, the device-specific parameter comprises a network address associated with a user electronic device typically used for establishing user sessions; a version of a browsing application used by the user for establishing user sessions.

In some implementations of the method, the user-device interaction parameter comprises at least one of: a short term user-device interaction parameter and a long term user-device interaction parameter.

In some implementations of the method, the method further comprises, prior to the acquiring, generating each of the respective user-behavior model.

In some implementations of the method, the respective user-behavior model has been generated by analyzing at least one of: device-specific parameter and user-device interaction parameter.

In some implementations of the method, the user-device interaction parameter comprises at least one of: user-associated click pattern; user-associated mouse movement pattern; user-associated typing pattern; user-specific function execution pattern; a user time patterns when the user typically establishes user sessions.

In some implementations of the method, the device-specific parameter comprises at least one of: a network address associated with a user electronic device typically used for establishing user sessions; a version of a browsing application used by the user for establishing user sessions.

In some implementations of the method, the user-device interaction parameter comprises at least one of: a short term user-device interaction parameter and a long term user-device interaction parameter.

According to another broad aspect of the present technology, there is provided a server. The server comprises: a communication interface for communication with an electronic device via a communication network, a processor operationally connected with the communication interface, the processor configured to authenticate a user in a network, the processor being further configured to: acquire a non-authorized user-behavior model associated with a non-authorized access to a network resource by an unauthorized entity, the non-authorized user-behavior model having been generated during blocking the non-authorized access to the network resource by the unauthorized entity; retrieve from a log stored on the network server, an indication of a plurality of users, each respective user associated with a respective user-behavior model; responsive to one of the respective user-behavior model matching the non-authorized user-behavior model, associate a user account associated with the respective user associated with the one of the respective user-behavior model with a security-violation parameter; responsive to the security-violation parameter, restrict user activity within the user account.

In some implementations of the server, the processor is further configured, prior to executing restricting, to execute a verification routine within the respective user account to confirm if the user access is unauthorized.

In some implementations of the server, to execute the verification routine, the processor is configured to present a user associated with the user account a challenge question.

In some implementations of the server, the security-violation parameter comprises a cookie associated with the user account augmented with a flag indicative of the security-violation parameter.

In some implementations of the server, the security-violation parameter is indicative of a degree of trust that the user associated with the user account is an un-authorized user.

In some implementations of the server, to restrict, the processor is configured to block access to the user account.

In some implementations of the server, to restrict, the processor is configured allow limited functionality with the user account.

In some implementations of the server, the non-authorized user-behavior model has been generated by analyzing at least one of: device-specific parameter and user-device interaction parameter.

In some implementations of the server, the user-device interaction parameter comprises at least one of: user-associated click pattern; user-associated mouse movement pattern; user-associated typing pattern; user-specific function execution pattern; a user time patterns when the user typically establishes user sessions.

In some implementations of the server, the device-specific parameter comprises: a network address associated with a user electronic device typically used for establishing user sessions; a version of a browsing application used by the user for establishing user sessions.

In some implementations of the server, the user-device interaction parameter comprises at least one of: a short term user-device interaction parameter and a long term user-device interaction parameter.

In some implementations of the server, the processor is further configured prior to executing acquiring, to generate each of the respective user-behavior model.

In some implementations of the server, the respective user-behavior model has been generated by analyzing at least one of: device-specific parameter and user-device interaction parameter.

In some implementations of the server, the user-device interaction parameter comprises at least one of: user-associated click pattern; user-associated mouse movement pattern; user-associated typing pattern; user-specific function execution pattern; a user time patterns when the user typically establishes user sessions.

In some implementations of the server, the device-specific parameter comprises at least one of: a network address associated with a user electronic device typically used for establishing user sessions; a version of a browsing application used by the user for establishing user sessions.

In some implementations of the server, the user-device interaction parameter comprises at least one of: a short term user-device interaction parameter and a long term user-device interaction parameter.

In the context of the present specification, unless provided expressly otherwise, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein.

In the context of the present specification, unless provided expressly otherwise, the expression "information" includes information of any nature or kind whatsoever capable of being stored in a database. Thus information includes, but is not limited to audiovisual works (images, movies, sound records, presentations etc.), data (location data, numerical data, user names, passwords, email addresses, etc.), text (opinions, comments, questions, messages, etc.), documents, spreadsheets, etc.

In the context of the present specification, unless provided expressly otherwise, the expression "component" is meant to include software (appropriate to a particular hardware context) that is both necessary and sufficient to achieve the specific function(s) being referenced.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
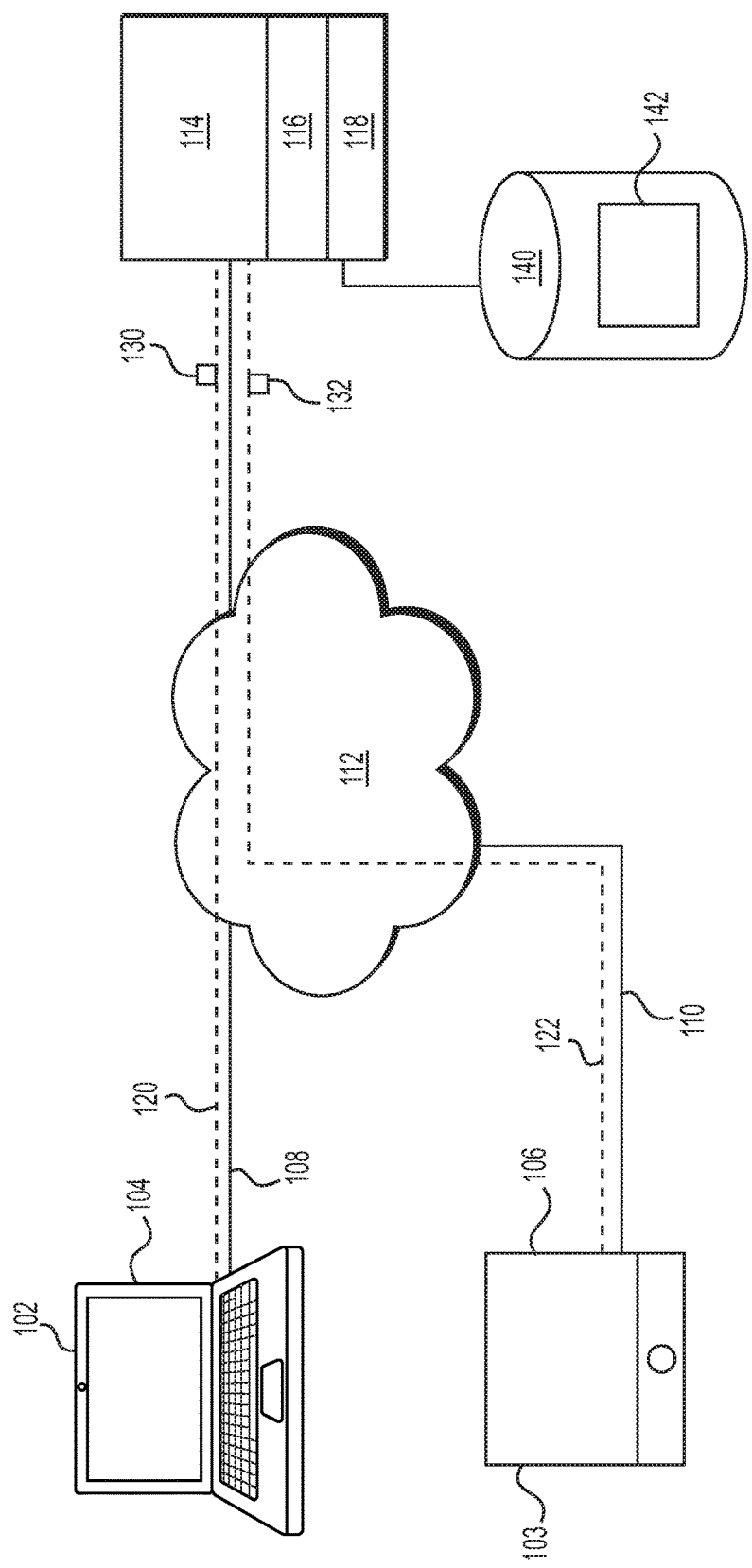
FIG. 1 depicts a system implemented in accordance with non-limiting embodiments of the present technology.

Referring to FIG. 1, there has been shown a diagram of a system 100. It is to be expressly understood that the system 100 is merely one possible implementation of the present technology. Thus, the description thereof that follows is intended to be only a description of illustrative examples of the present technology. This description is not intended to define the scope or set forth the bounds of the present technology. In some cases, what are believed to be helpful examples of modifications to computer system 100 may also be set forth below.

This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances a simple implementation of the present technology, and that where such is the case they have been presented in this manner as an aid to understanding. As persons skilled in the art would understand, various implementations of the present technology may be of a greater complexity.

FIG. 1 illustrates the system 100 in accordance with one implementation of the present technology. The system 100 comprises a first electronic device 102. The first electronic device 102 is typically associated with a user (not depicted) and, as such, can sometimes be referred to as a "client device". It should be noted that the fact that the first electronic device 102 is associated with the user does not need to suggest or imply any mode of operation—such as a need to log in, a need to be registered or the like.

The implementation of the first electronic device 102 is not particularly limited, but as an example, the first electronic device 102 may be implemented as a personal computer (desktops, laptops, netbooks, etc.), a wireless electronic device (a cell phone, a smartphone, a tablet and the like), as well as network equipment (a router, a switch, or a gateway). The general implementation of the first electronic device 102 is known in the art and, as such, will not be described here at much length. Suffice it to say that the first electronic device 102 comprises a user input interface (such as a keyboard, a mouse, a touch pad, a touch screen and the like) for receiving user inputs; a user output interface (such as a screen, a touch screen, a printer and the like) for providing visual or audible outputs to the user; a network communication interface (such as a modem, a network card and the like) for two-way communication over a communications network 112; and a processor coupled to the user input interface, the user output interface and the network communication interface, the processor being configured to execute various routines, including those described herein below. To that end the processor may store or have access to computer readable commands which commands, when executed, cause the processor to execute the various routines described herein.

The system 100 further comprises a second electronic device 103. The second electronic device 103 is also associated with the user (not depicted) and, as such, can sometimes be referred to as a "client device". It should be noted that the fact that the second electronic device 103 is associated with the user does not need to suggest or imply any mode of operation—such as a need to log in, a need to be registered or the like.

The second electronic device 103 comprises hardware and/or software and/or firmware (or a combination thereof), to execute a network application 104. The second electronic device 103 comprises hardware and/or software and/or firmware (or a combination thereof), to execute a network application 106. Generally speaking, the nature of the network application 104 and the network application 106 is not particular limited. In various embodiments of the present technology, the network application 104 and the network application 106 can enable the user to perform one or more of: send and receive electronic messages (such as e-mails, text messages, multimedia messages and the like), browse network resources (such as search and/r or access web resources) and the like.

For the purposes of the examples to be provided herein below, it shall be assumed that the network application 104 and the network application 106 are both executed as an e-mail application.

Furthermore, the system 100 comprises the above-mentioned communications network 112. In some non-limiting embodiments of the present technology, the communications network 112 can be implemented as the Internet. In other embodiments of the present technology, the communications network 112 can be implemented differently, such as any wide-area communications network, local-area communications network, a private communications network and the like.

The first electronic device 102 is coupled to the communication network 112 via a first communication link 108 and the second electronic device 103 is coupled to the communication network 112 via a second communication link 110. How the first communication link 108 and the second communication link 110 are implemented is not particularly limited and will depend on how the associated one of the first electronic device 102 and the second electronic device 103 is implemented.

For example, the first electronic device 102 can be implemented, in this example, as a laptop, the first communication link 108 can be wireless (such as the Wireless Fidelity, or WiFi® for short, Bluetooth® or the like) or wired (such as Ethernet™ based connection).

As another example, the second electronic device 103 can be implemented, in this example, as a tablet computer and, as such, the second communication link 110 can be wireless—such as the Wireless Fidelity, or WiFi® for short, Bluetooth® or the like or cellular (such as 3G, LTE and the like).

The system 100 further comprises a server 114 coupled to the communications network 112 via a communication link (not separately numbered). The server 114 can be implemented as a conventional computer server. In an example of an embodiment of the present technology, the server 114 can be implemented as a Dell™ PowerEdge™ Server running the Microsoft™ Windows Server™ operating system. Needless to say, the server 114 can be implemented in any other suitable hardware and/or software and/or firmware or a combination thereof. In the depicted non-limiting embodiment of present technology, the server 114 is a single server. In alternative non-limiting embodiments of the present technology, the functionality of the server 114 may be distributed and may be implemented via multiple servers. Given the above example of the network application 104 and the network application 106 being implemented as e-mail application, the server 114 can be implemented as an e-mail server.

The implementation of the server 114 is well known. However, briefly speaking, the server 114 comprises a communication interface (not depicted) structured and configured to communicate with various entities (such as the first electronic device 102, for example and other devices potentially coupled to the communications network 112) via the communications network 112. The server 114 further comprises at least one computer processor (not depicted) operationally connected with the communication interface and structured and configured to execute various processes to be described herein.

In order to authenticate the user into the e-mail service provided by the server 114, the user typically has to provide log in credential to authenticate herself to the server 114. The log in credentials can be a combination of a log in name and a password, or any other suitable authentication means.

For the purposes of the description to be presented herein below, it shall be assumed that the user is logged into e-mail service on both the network application 104 and the network application 106. In other words and as an example only, it shall be assumed that the user has provided her log in credentials and password through both the network application 104 and the network application 106. As such, the first electronic device 102 has a first communication session 120 established between the first electronic device 102 and the server 114. The second electronic device 103 has a second communication session 122 established between the first electronic device 102 and the server 114.

The server 114 is configured to execute an access module 116. The access module 116 is configured to receive an access request from the user, the user request including user log in credentials from the network application 104 and the network application 106 and to authenticate or deny such an access request based on authorized user credentials saved in an internal memory (not depicted).

The access module 116 is also configured to assign a first session identifier 130 to the first communication session 120 and a second session identifier 132 to the second communication session 122.

It should be noted that even though the first communication session 120 is depicted as executed by the first electronic device 102 and the second communication session 122 is depicted as executed by the second electronic device 103, in alternative embodiments, the first communication session 120 and the second communication session 122 can be executed by a single electronic device, such as either the first electronic device 102 or the second electronic device 103.

The server 114 is also configured to implement a session analyzer module 118. Generally speaking, the session analyzer module 118 is configured to analyze one or more of the user sessions, such as the first communication session 120 and the second communication session 122 to determine if the user initiating or handling those user sessions is indeed an authorized user of the service associated therewith. As those skilled in the art will appreciate, even though the correct log in credentials may have been presented during the log in operation, the user presenting the correct log in credentials may not be the actual authorized user.

For example, it is possible that the user credentials have been mis-appropriated, for example, by a spam robot (not depicted) or by a malicious individual. As is known to those of skill in the art, the spam robot may maliciously use one of the un-authorized log ins through the first communication session 120 and/or the second communication session 122 to send out malicious communication, such as spam e-mail and the like. It should be expressly understood that teachings presented herein are not limited to any specific purpose for which given log in may be mis-appropriated.

The session analyzing module 118 is configured to maintain a user profile database 140. The user profile database 140 stores a user profile table 142. In some embodiments of the present technology, the user profile table 142 maps a given set of user log in credentials to an associated user behaviour model. In other embodiments, the user profile table 142 maps a session identifier associated with a given user communication session (such as the first communication session 120 and the second communication session 122) to an associated user behaviour model associated therewith.

Within embodiments of the present technology, the session analyzing module 118 is configured to determine the user behaviour model and to store an indication thereof into the user profile database 142. Within various non-limiting embodiments of the present technology, the session analyzing module 118 is configured to determine the user behaviour model based on at least one of a device-specific parameter and a user-device interaction parameter.

Figure 2:
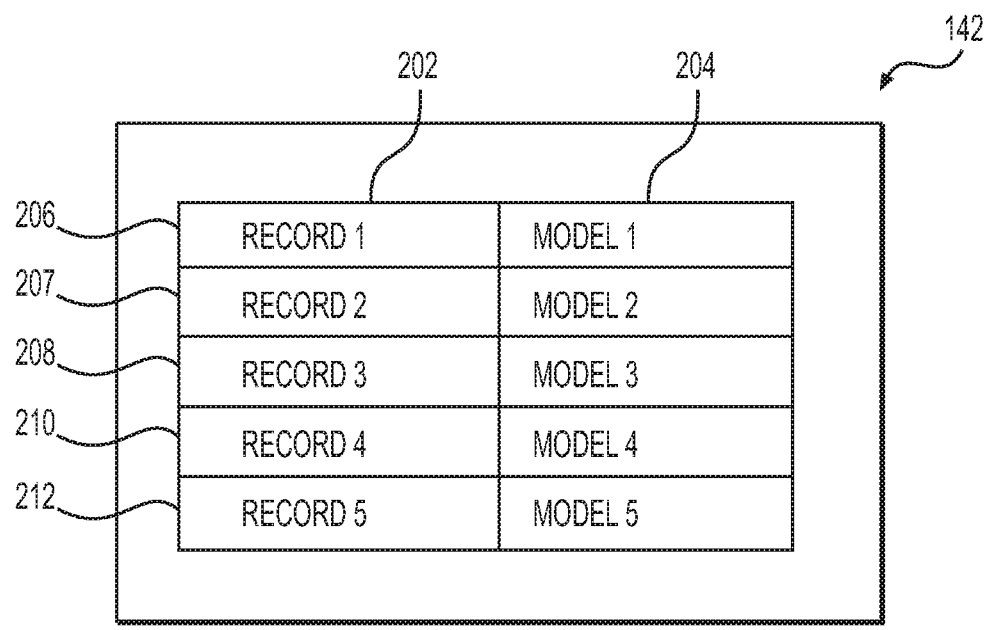
FIG. 2 depicts a non-limiting embodiment of the user profile table maintained by a server of the system of FIG. 1.

With reference to FIG. 2, there is depicted a non-limiting embodiment of the user profile table 142. Within the depicted embodiment, the user profile table 142 maps a given one of a user identifier 202 to an associated user behaviour model 204. Within some embodiments of the present technology, the user identifier 202 can be user log in credentials (or some other suitable unique user identifier). In other embodiments of the present technology, the user identifier 202 can be a session identifier (such as one of the first communication session 120 and the second communication session 122). In some embodiments of the present technology, the session identifier can be implemented as a session cookie. It should be expressly understood that in alternative embodiments of the present technology, the session identifier can be implemented as any other suitable unique identifier associated with the one of the first communication session 120 and the second communication session 122.

Within the illustrated embodiment, the user profile table 142 comprises five records—a first record 206, a second record 207, a third record 208, a fourth record 210 and a fifth record 212. Each of the records maps a given user identifier 202 (illustrated for simplicity as "Record 1" to "Record 5") with the associated user behavior model 204 (illustrated for simplicity as "Model 1" to "Model 5"). Naturally, it should be appreciated that the user profile table 142 may store more than the five records that are illustrated in FIG. 2.

Figure 3:
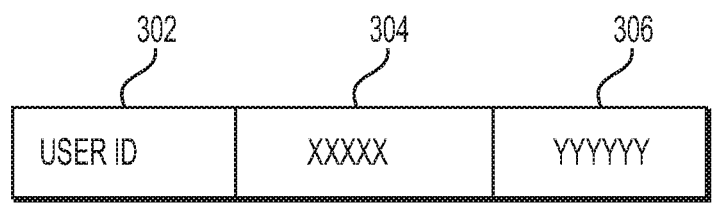
FIG. 3 depicts a non-limiting embodiment of the information stored within a given one of a user behavior models stored within the user profile table of FIG. 2.

With reference to FIG. 3 there is depicted a non-limiting embodiment of the information stored within a given one of a user behavior model 204. In the depicted non-limiting embodiment, the user behavior model 204 includes a user identifier 302 (illustrated as "USER ID"), a first model portion 304 and a second model portion 306. It should be noted that in alternative non-limiting embodiments, the first model portion 304 and the second model portion 306 can be implemented as a single model portion.

Within some embodiments of the present technology, the first model portion 304 is based on the one or more of the device-specific parameters. In some embodiments, the first model portion 304 is a hash function of the one or more of the device-specific parameters. In the illustrated embodiments, the hash function is illustrated as "XXXXX", but it can take any alpha-numerical form. By the same token, the second model portion 306 is based on one or more of the user-device interaction parameters. In some embodiments, the second model portion 306 is a hash function of the one or more of the user-device interaction parameters. In the illustrated embodiments, the hash function is illustrated as "YYYYY", but it can take any alpha-numerical form.

In alternative embodiments, rather then being two hash functions, the user behavior model 204 can be generated as a single hash function based on the device specific parameters and the user-device interaction parameters, hence, creating a single model portion 304, 306.

Within the various embodiments of the present technology, the device-specific parameter is generally indicative of one or more electronic devices (such as the first electronic device 102 and the second electronic device 103) that the user typically uses to establish the user communication sessions (such as the first communication session 120 and the second communication session 122) with the server 114. The exact implementation of the device-specific parameter is not particularly limited and various examples thereof can include but are not limited to:

- a network address associated with one or more electronic devices (such as the first electronic device 102 and the second electronic device 103) that the user typically uses to establish the user communication sessions (such as the first communication session 120 and the second communication session 122);
- a version of a browsing application installed and used by the user on the one or more electronic devices (such as the first electronic device 102 and the second electronic device 103) that the user typically uses to establish the user communication sessions (such as the first communication session 120 and the second communication session 122);

Within the various embodiments of the present technology, the user-device interaction parameter is generally indicative of the type of actions the user typically performs using the one or more electronic devices (such as the first electronic device 102 and the second electronic device 103) within the user communication sessions (such as the first communication session 120 and the second communication session 122) with the server 114.

The exact implementation of the user-device interaction parameter is not particularly limited and various examples thereof can include but are not limited to:

- a user time patterns when the user typically establishes user sessions.
- user-associated click pattern;
- user-associated mouse movement pattern;
- user-associated typing pattern;
- user-specific function execution pattern.

The following is meant to provide some of the specific examples to how the above device-specific parameters and the user-device interaction parameters can be used for establishing the user behaviour model.

In some embodiments of the present technology, the session analyzing module 118 calculates the user-device interaction parameter based on the user interaction with the service provide by the server 114 (in this example, an e-mail service). For example, the session analyzing module 118 can analyze the history of the user interaction with the e-mail service and build a model of the typical user behavior. Some examples of the factors that can be analyzed include but are not limited to: if the user organizes e-mail messages into folders, if the user moves e-mail messages into folders, if the user flags e-mail messages, if the user marks e-mail messages as read/unread, if the user checks spam folder, if the user performs batch operations with e-mail messages (such as mass delete function or mass move function), message reading patterns associated with the user, if the user uses a search function to find a specific e-mail message in the inbox or in one of the other folders, the typical number of e-mail messages sent in a pre-determined period of time (such as 10 minutes, 1 hour, 1 day and the like) by the user. These interactions can be thought of as the "application specific parameters" of the user-device interaction parameter class.

The session analyzing module 118 can also analyze what can be categorized as "application agnostic parameters" of the user-device interaction class. These parameters can include but are not limited to: user-specific click patterns, user-specific typing speed, user-specific mouse movement patterns and the like.

In some additional embodiments of the present technology, the session analyzing module 118 can also analyze user-device interaction parameters associated with the service other than that provided by the server 114. In some embodiments of the present technology, the session analyzing module 118 can receive information representative with user-device interaction parameters associated with other services that the user uses. This information can be received, for example, through an Application Programming Interface (API) with other servers (not depicted) responsible for delivering other services for which the user has subscribed.

In some embodiments of the present technology, the user can be authenticated in the service provided by the server 114 and the other services by means of a single sign in credentials. Examples of the single sign in credentials are known in the art and some examples include but are not limited to Yandex.Passport™ provided by the Yandex™ search engine, Google+™ single sign in and the like. In some embodiments of the present technology, the session analyzing module 118 can receive an indication of user-device interaction parameters from a server (not depicted) responsible for handling single sign in credential service. In other embodiments, each of the other services may be associated with separate log in credentials and within those embodiments, the session analyzing module 118 can receive an indication of user-device interaction parameters from an aggregation server (not depicted) responsible for aggregating user behaviour information or the session analyzing server 118 can act as such an aggregation server.

In some embodiments, the various sources of the user-device interaction parameters can be servers (not depicted) responsible for execution of anti-spam services, geo-location information servers, targeted advertising servers and the like. Some of these servers can be the same as the server 114 and some of these can be executed as separate servers, which are configured to exchange data with the server 114 via suitable APIs and the like.

In some embodiments of the present technology, the device specific parameter can be embodied as one or more of the typical IP addresses associated with the electronic devices (such as the first electronic device 102 and the second electronic device 103) the user uses to connect to the service provided by the server 114. In alternative embodiments, the device specific parameter can be embodied in an indication of a user agent that the first electronic device 102 and the second electronic device 103 to establish the communication sessions (such as the first communication session 120 and the second communication session 122) with the server 114. The indication of the user agent can be an identifier of a browser used (such as Yandex™ browser, Google™ Chrome™ browser, Opera™ browser or the like). Alternatively, the indication of the user agent can be a version of the browser used or a combination of the identifier and the version of the browser used.

In some embodiments of the present technology, the user-device interaction parameter can be implemented as one (or a combination of): a short term user-device interaction parameter and a long term user-device interaction parameter. In some embodiments of the present technology, the short term user-device interaction parameters indicative of user behavior over a comparatively short period of time, such as within a single instance of a user session (such as during one of the first communication session 120 and a second session identifier 132. The long term user-device interaction parameter can be indicative of the user behavior over a comparatively longer period of time, such over a serious of user sessions similar to the first communication session 120 and a second session identifier 132.

In some embodiments of the present technology, the session analyzing module 118 is configured to calculate a security-violation parameter. In some embodiments of the present technology, the security-violation parameter is implemented as an indicator of a degree of trust that a given user session is originated from an authorized user or not. In some embodiments, the security-violation parameter can be a numeric value on a given scale, such as zero to one hundred and the like, whereby the higher the numeric value the more likely it is that the user associated with the given user session is not the authorized user or vice versa.

In some embodiments of the present technology, the security-violation parameter can be calculated using the following equation:

$$SVP = SVP\_old + (sum(sum(SVP\_sess\_i))) + sum(SVP\_i) \quad \text{Equation 1}$$

In which, SVP is the security-violation parameter, the SVP_old is a past security-violation parameter for a given past period of time, SVP_sess_i is a security-violation parameter associated with a given user session, or in other words, based on short-term factors (where i=0 . . . N representative of sources of the information for the user-device interaction factors and/or device specific factors), SVP_i is the security-violation parameter based on long term factors.

In some embodiments of the present technology, the session analyzing module 118 is further configured to calculate a session-independent security violation parameter (SVP_i). In some embodiments of the present technology, the session analyzing module 118 is configured to determine the session-independent security violation parameter based on the user-device interaction parameters and/or user-specific parameters that are long-term parameters, as has been described above.

Within embodiments of the present technology, the security-violation parameter associated with a given user session, which can also be thought of as a "session-specific security-violation parameter" can be calculated as follows. The session analyzing module 118 receives one or more of each of the user-device interaction parameters and device specific parameters. For each one of the one or more of each of the user-device interaction parameters and device specific parameters, the session analyzing module 118 can adjust the value of the security-violation parameter upwards or downwards (or leave unchanged for that matter), depending on what the given one of the one or more of each of the user-device interaction parameters and device specific parameters indicates.

As such, in various embodiments of the present technology, the security violation parameter can be a negative value (if the analysis is indicative of negative parameters outweigh the positive parameters indicative of the user not being an authorized user), a positive value (if the user performs typical actions in line with the stored authorized user behavior profile) or it can be zero (in case the user's actions or the device-specific parameters do not allow for the session analyzing module 118 to make a determination.

In some embodiments of the present technology, the session analyzing module 118 is also configured to calculate a session-specific security violation parameter can be calculated using the following equation:

$$SVP\_sess = sum(SVP\_sess\_i) \quad \text{Equation 2}$$

In which, SVP_sess is the session-specific security violation parameter and the SVP_sess_i is the security-violation parameter associated with a given user session, or in other words, based on short-term factors (where i=0 . . . N representative of sources of the information for the user-device interaction factors and/or device specific factors).

Figure 4:
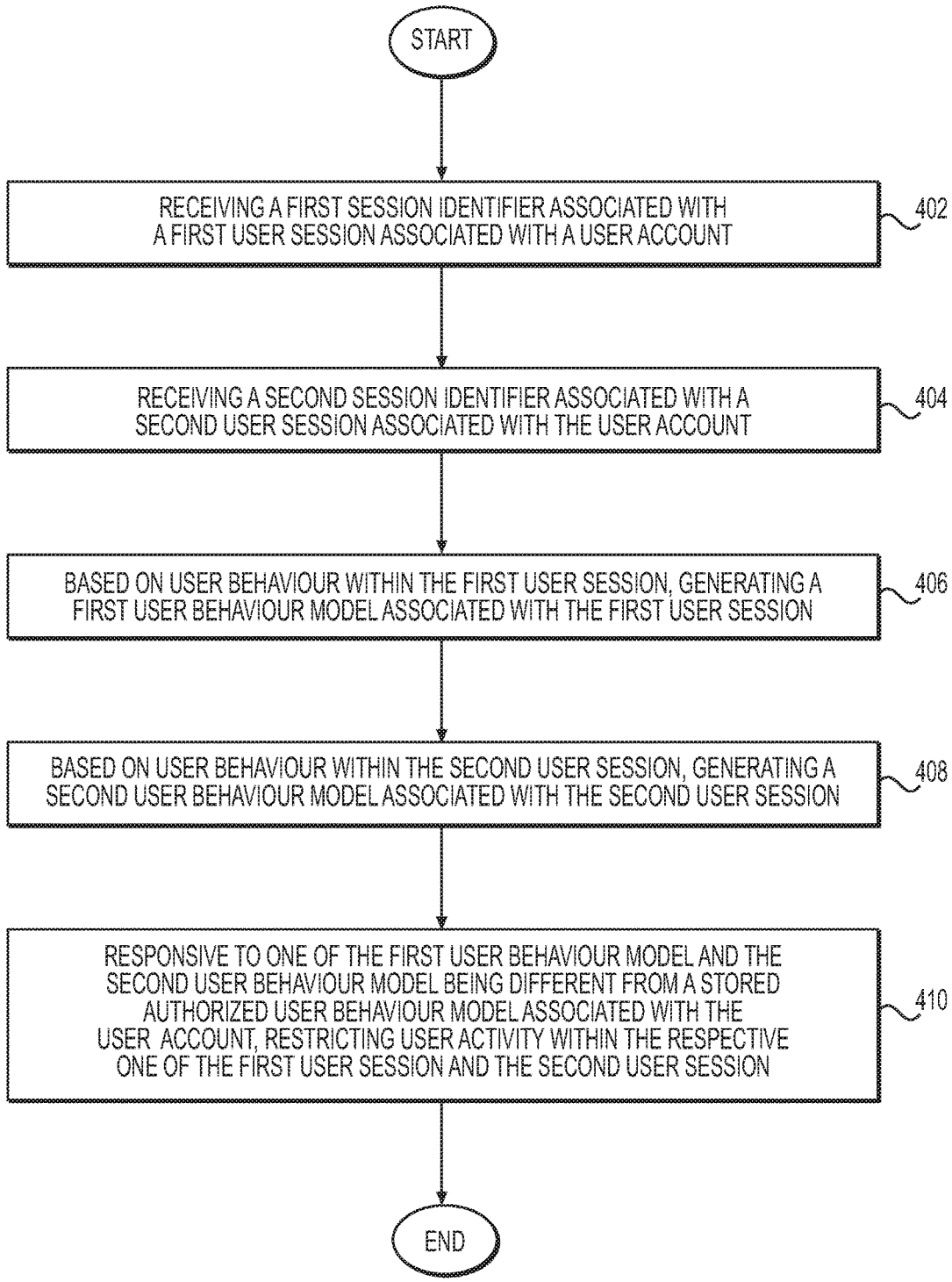
FIG. 4 depicts a block diagram of a method executed in accordance with non-limiting embodiments of the present technology.

Given the architecture described above, it is possible to execute a method of processing a potentially unauthorized user access request. With reference to FIG. 4, there is depicted a block diagram of a method 400, the method 400 being executed in accordance with non-limiting embodiments of the present technology. The method 400 can be executed by the server 114 and more specifically by the session analyzing module 118.

Step 402—Receiving a First Session Identifier Associated with a First Communication Session Associated with a User Account The method 400 starts at step 402, where the session analyzing module 118 receives a first session identifier associated with the first communication session 120 associated with a user account. In some embodiments, the step 402 is executed in response to the first communication session 120 being established. In other embodiments, the step 402 is executed when the first communication session 120 is already in progress, for example, after a pre-determined period of time after establishment of the first communication session 120.

In some embodiments of the present technology, the first session identifier comprises a session cookie.

Step 404—Receiving a Second Session Identifier Associated with a Second Communication Session Associated with the User Account Next, at step 404, the session analyzing module 118 receives a second session identifier associated with the second communication session 122 associated with the user account.

In some embodiments of the present technology, the second session identifier comprises a session cookie.

It should be noted that in some embodiments, the first communication session 120 is executed on the first electronic device 102 and the second communication session 122 is executed on the second electronic device 103. This embodiment was described at length with reference to FIG. 1. However, in alternative embodiments of the present technology, the first communication session 120 and the second communication session 122 can be executed on the same electronic device—such as one of the first electronic device 102 or the second electronic device 103.

Step 406—Based on User Behaviour within the First Communication Session, Generating a First User Behaviour Model Associated with the First Communication Session Next, at step 406, the session analyzing module 122, based on user behaviour within the first communication session 120, generates a first user behaviour model associated with the first communication session 120.

In some embodiments of the present technology, the step of generating the first user behaviour model comprises analyzing at least one of: device-specific parameter and user-device interaction parameter.

The user-device interaction parameter can be one or more of:
user-associated click pattern;
user-associated mouse movement pattern;
user-associated typing pattern;
user-specific function execution pattern;
a user time patterns when the user typically establishes user sessions.

The device specific parameter can include one or more of:
a network address associated with a user electronic device typically used for establishing user sessions;
a version of a browsing application used by the user for establishing user sessions.

In some embodiments of the present technology, the user-device interaction parameter comprises at least one of: a short term user-device interaction parameter and a long term user-device interaction parameter.

Step 408—Based on User Behaviour within the Second Communication Session, Generating a Second User Behaviour Model Associated with the Second Communication Session Next, at step 408, the session analyzing module 122, based on user behaviour within the second communication session 122, generates a second user behaviour model associated with the second communication session 122.

The second user behavior model can be generated substantially similar to that of the first user behavior model.

Step 410—Responsive to One of the First User Behaviour Model and the Second User Behaviour Model being Different from a Stored Authorized User Behaviour Model Associated with the User Account, Restricting User Activity within the Respective One of the First Communication Session and the Second Communication Session Next, at step 410, the session analyzing module 118, responsive to one of the first user behaviour model and the second user behaviour model being different from a stored authorized user behaviour model associated with the user account, restricts user activity within the respective one of the first communication session 120 and the second communication session 122.

In some embodiments of the present technology, the step of restricting user activity within the respective one of the first communication session 120 and the second communication session 122, does not affect the other one of the first communication session 120 and the second communication session 122. As such, in some embodiments, the method 400 further comprises allowing unrestricted user activity within the other one of the first communication session 120 and the second communication session 122. A specific technical effect attributable to these embodiments of the present technology, unlike those prior art technologies where the access restriction is done on the per-user-account basis, is that the restriction of the user activity within the specific communication session being suspected as being un-authorized does not affect user activity within the other communication session that appears to be associated with the authorized user.

In some embodiments of the present technology, the step of restricting comprises blocking access to the user account. In some embodiments of the present technology, the step of restricting comprises allowing limited functionality with the user account.

In some embodiments of the present technology, prior to executing the step of restricting, the method further comprises executing a verification routine within the respective one of the first communication session and the second communication session to confirm if the user access is unauthorized. In some embodiments, the verification routine may comprise providing one or more challenge, the answer to which had been pre-set by the authorized user of the account. In alternative embodiments, the verification routine may include presenting one or more question generated by the session analyzing module 118 generated based on knowledge that only the authorized user would have (such as, when the account was created and the like).

In some embodiments of the present technology, the step of restricting comprises associating a session cookie that is in turn associated with the respective one of the first communication session and the second communication session with a flag indicative of a security-violation parameter. The security-violation parameter can be indicative of a degree of trust that the respective one of the first communication session and the second communication session is associated with an authorized user.

The security-violation parameter can be embodied in a cookie stored in association with the respective one of the first communication session and the second communication session.

In some embodiments of the present technology, at a time prior to the step of receiving, the method further includes generating the stored authorized user behaviour model associated with the user account. The step of generating the stored authorised user behaviour model comprises analyzing at least one of: device-specific factors and user-device interaction factors.

The method 400 can then terminate or return to executing step 402.

Figure 5:
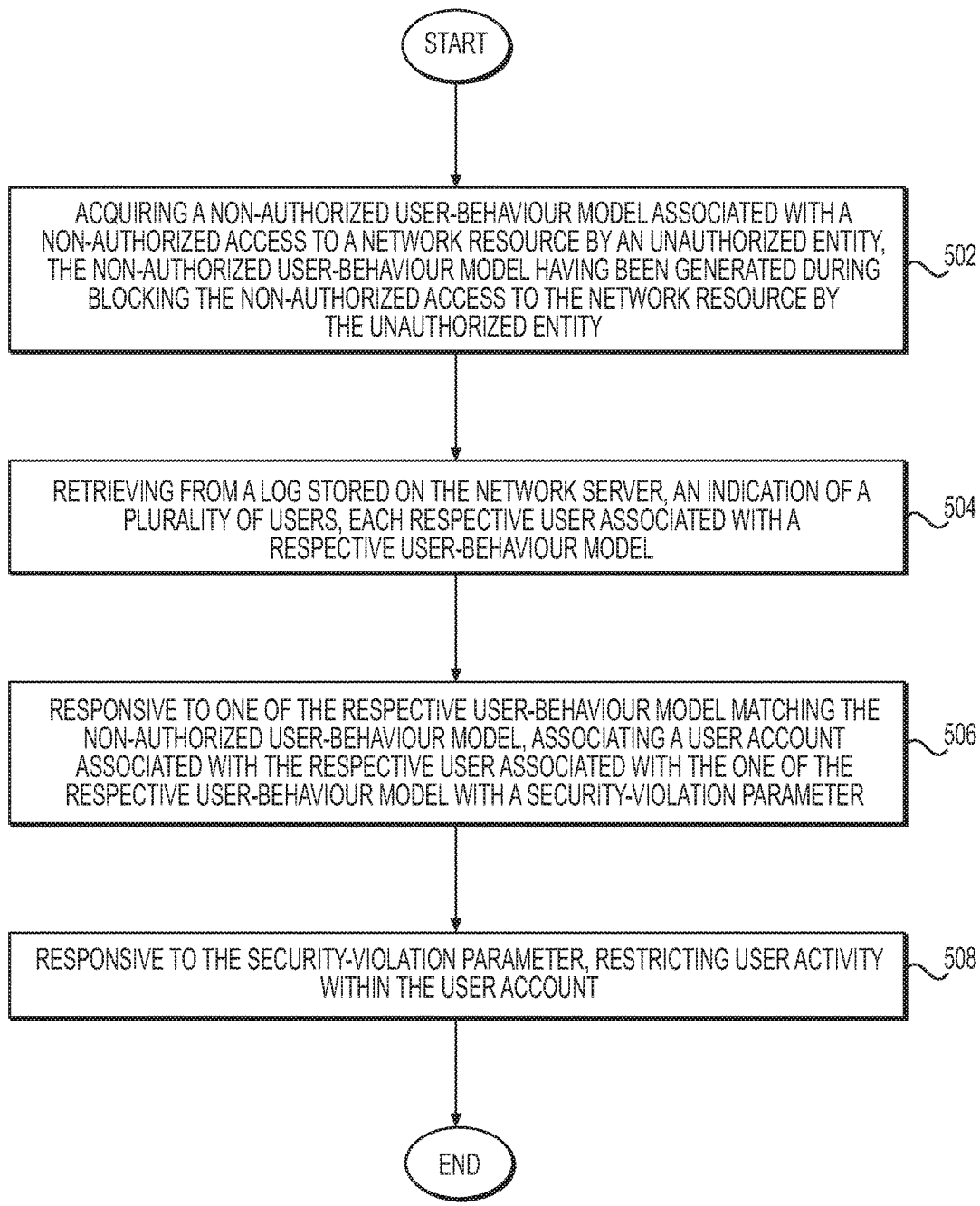
FIG. 5 depicts a block diagram of another method executed in accordance with other non-limiting embodiments of the present technology.

Given the architecture described above, it is possible to execute a method of authenticating a user in a network, the method executed on a server, the method. With reference to FIG. 5, there is depicted a block diagram of a method 500, the method 500 being executed in accordance with some other non-limiting embodiments of the present technology. The method 500 can be executed by the server 114 and more specifically by the session analyzing module 118.

Step 502—Acquiring a Non-Authorized User-Behavior Model Associated with a Non-Authorized Access to a Network Resource by an Unauthorized Entity, the Non-Authorized User-Behavior Model Having been Generated During Blocking the Non-Authorized Access to the Network Resource by the Unauthorized Entity The method 500 starts at step 502, where the session analyzing module 118 acquires a non-authorized user-behavior model associated with a non-authorized access to a network resource by an unauthorized entity, the non-authorized user-behavior model having been generated during blocking the non-authorized access to the network resource by the unauthorized entity. Within the embodiments of the present technology, the non-authorized user-behavior model can be generated by analyzing at least one of: device-specific parameter and user-device interaction parameter.

In some embodiments of the present technology, the user-device interaction parameter comprises at least one of:
  user-associated click pattern;
  user-associated mouse movement pattern;
  user-associated typing pattern;
  user-specific function execution pattern;
  a user time patterns when the user typically establishes user sessions.

In some embodiments of the present technology, the device-specific parameter comprises
  a network address associated with a user electronic device typically used for establishing user sessions;
  a version of a browsing application used by the user for establishing user sessions In some embodiments of the present technology, the user-device interaction parameter comprises at least one of: a short term user-device interaction parameter and a long term user-device interaction parameter.

Step 504—Retrieving from a Log Stored on the Network Server, an Indication of a Plurality of Users, Each Respective User Associated with a Respective User-Behavior Model Next, at step 504, the session analyzing module 118 retrieves from a log stored on the network server, an indication of a plurality of users, each respective user associated with a respective user-behavior model. In some embodiments of the present technology, the log can be implemented as the afore-described user profile table 142.

In some embodiments of the present technology, prior to executing the step of acquiring, the method further comprises a step of generating each of the respective user-behavior models. As has been explained above, the respective user-behavior model can be generated by analyzing at least one of: device-specific parameter and user-device interaction parameter. In other words, the method 500, once an authorized access has been established (for example, using the method 400), can retrieve the user behavior profile associated with the un-authorized entity and, as will be described below, "look back" to all other known user behavior profiles to attempt to detect un-authorized ones by comparing them to the un-authorized user behavior model.

Similarly to what was explained above, the user-device interaction parameter comprises at least one of:
  user-associated click pattern;
  user-associated mouse movement pattern;
  user-associated typing pattern;
  user-specific function execution pattern;
  a user time patterns when the user typically establishes user sessions.

By the same token, the device-specific parameter comprises at least one of:
  a network address associated with a user electronic device typically used for establishing user sessions;

a version of a browsing application used by the user for establishing user sessions.

Step 506—Responsive to One of the Respective User-Behavior Model Matching the Non-Authorized User-Behavior Model, Associating a User Account Associated with the Respective User Associated with the One of the Respective User-Behavior Model with a Security-Violation Parameter Next, at step 506, the session analyzing module 118, responsive to one of the respective user-behavior models matching the non-authorized user-behavior model, associates a user account associated with the respective user associated with the one of the respective user-behavior model with a security-violation parameter.

In some embodiments of the present technology, the security-violation parameter comprises a cookie associated with the user account augmented with a flag indicative of the security-violation parameter. In some embodiments of the present technology, the security-violation parameter is indicative of a degree of trust that the user associated with the user account is an un-authorized user.

Step 508—Responsive to the Security-Violation Parameter, Restricting User Activity within the User Account Next, at step 508, the session analyzing module 118, responsive to the security-violation parameter, restricts user activity within the user account.

In some embodiments of the present technology, prior to executing the step of restricting, the method further comprises executing a verification routine within the respective one of the first communication session and the second communication session to confirm if the user access is unauthorized. In some embodiments, the verification routine may comprise providing one or more challenge, the answer to which had been pre-set by the authorized user of the account. In alternative embodiments, the verification routine may include presenting one or more question generated by the session analyzing module 118 generated based on knowledge that only the authorized user would have (such as, when the account was created and the like).

In some embodiments of the present technology, the step of restricting comprises blocking access to the user account. In some embodiments of the present technology, the step of restricting comprises allowing limited functionality with the user account.

The method 500 then terminates or reverts to execution of step 502, when another un-authorised user behavior profile is determined.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of processing a potentially unauthorized user access request, the method executable on a server, the method comprising:
receiving a first session identifier associated with a first communication session associated with a user account;
receiving a second session identifier associated with a second communication session associated with the user account, the second communication session being active concurrently with the first communication session;
based on user behaviour within the first communication session, generating a first user behaviour model associated with the first communication session, the first user behaviour model having a first model portion based on at least one device-specific parameter and a second model portion based on at least one user-device interaction parameter, the user-device interaction parameter being indicative of a type of action performed by a first electronic device within the first communication session;
based on user behaviour within the second communication session, generating a second user behaviour model associated with the second communication session the second user behaviour model having a first model portion based on at least one device-specific parameter and a second model portion based on at least one user-device interaction parameter, the user-device interaction parameter being indicative of a type of action performed by a second electronic device within the second communication session;
responsive to one of the first user behaviour model and the second user behaviour model being different from a stored authorized user behaviour model associated with the user account, the stored authorized user behaviour model having a first model portion based on at least one device-specific parameter and a second model portion based on at least one user-device interaction parameter, restricting user activity within the respective one of the first communication session and the second communication session; and
allowing unrestricted user activity within the other one of the first communication session and the second communication session.

2. The method of claim 1, the method further comprising allowing unrestricted user activity within the other one of the first communication session and the second communication session.

3. The method of claim 1, wherein the first session identifier comprises a session cookie.

4. The method of claim 1, wherein the second session identifier comprises a session cookie.

5. The method of claim 1, wherein the first electronic device and the second electronic device are different electronic devices.

6. The method of claim 1, wherein the first electronic device and the second electronic device are a single electronic device.

7. The method of claim 1, where the generating the first model portion and the second model portion of the first user behaviour model and the second user behavior model comprises applying a hashing function to the device-specific parameter and the user-device interaction parameter.

8. The method of claim 7, wherein the user-device interaction parameter comprises at least one of:
user-associated click pattern;
user-associated mouse movement pattern;
user-associated typing pattern;
user-specific function execution pattern; and
a user time patterns when the user typically establishes user sessions.

9. The method of claim 7, wherein the device specific parameter comprises at least one of:
a network address associated with a user electronic device typically used for establishing user sessions; and a version of a browsing application used by the user for establishing user sessions.

10. The method of claim 7, wherein the user-device interaction parameter comprises at least one of: a short term user-device interaction parameter and a long term user-device interaction parameter.

11. The method of claim 1, further comprising at a time prior to the receiving, generating the stored authorized user behaviour model associated with the user account.

12. The method of claim 11, wherein the generating first model portion and the second model portion of the stored authorised user behaviour model comprises applying a hashing function to the device-specific parameter and the user-device interaction parameter.

13. The method of claim 1, wherein the restricting comprises blocking access to the user account.

14. The method of claim 1, wherein the restricting comprises allowing limited functionality with the user account.

15. The method of claim 1, wherein prior to the restricting, the method further comprises executing a verification routine within the respective one of the first communication session and the second communication session to confirm if the user access is unauthorized.

16. The method of claim 1, wherein the restricting comprises associating a cookie that is in turn associated with the respective one of the first communication session and the second communication session with a flag indicative of a security-violation parameter.

17. The method of claim 1, further comprising determining a security-violation parameter indicative of a degree of trust that the respective one of the first communication session and the second communication session is associated with an authorized user.

18. The method of claim 17, wherein the security-violation parameter is embodied in a cookie stored in association with the respective one of the first communication session and the second communication session.

19. A server comprising:
a communication interface for communication with a first electronic device and a second electronic device via a communication network,
a processor operationally connected with the communication interface, the processor configured to process a potentially unauthorized user access request, the processor being further configured to:
receive a first session identifier associated with a first communication session associated with a user account;
receive a second session identifier associated with a second communication session associated with the user account, the second communication session being active concurrently with the first communication session;
based on user behaviour within the first communication session, generate a first user behaviour model associated with the first communication session, the first user behaviour model having a first model portion based on at least one device-specific parameter and a second model portion based on at least one user-device interaction parameter, the user-device interaction parameter being indicative of a type of action performed by the first electronic device within the first communication session;
based on user behaviour within the second communication session, generate a second user behaviour model associated with the second communication session the second user behaviour model having a first model portion based on at least one device-specific parameter and a second model portion based on at least one user-device interaction parameter, the user-device interaction parameter being indicative of a type of action performed by the second electronic device within the second communication session;
responsive to one of the first user behaviour model and the second user behaviour model being different from a stored authorized user behaviour model associated with the user account, the stored authorized user behaviour model having a first model portion based on at least one device-specific parameter and a second model portion based on at least one user-device interaction parameter, restrict user activity within the respective one of the first communication session and the second communication session; and
allow unrestricted user activity within the other one of the first communication session and the second communication session.

20. The server of claim 19, the processor being further configured to allow unrestricted user activity within the other one of the first communication session and the second communication session.

* * * * *